Dec. 18, 1951     L. C. HAMMOND     2,578,884
WORK HOLDER FOR GRINDING ROUTER BITS
Filed March 4, 1949
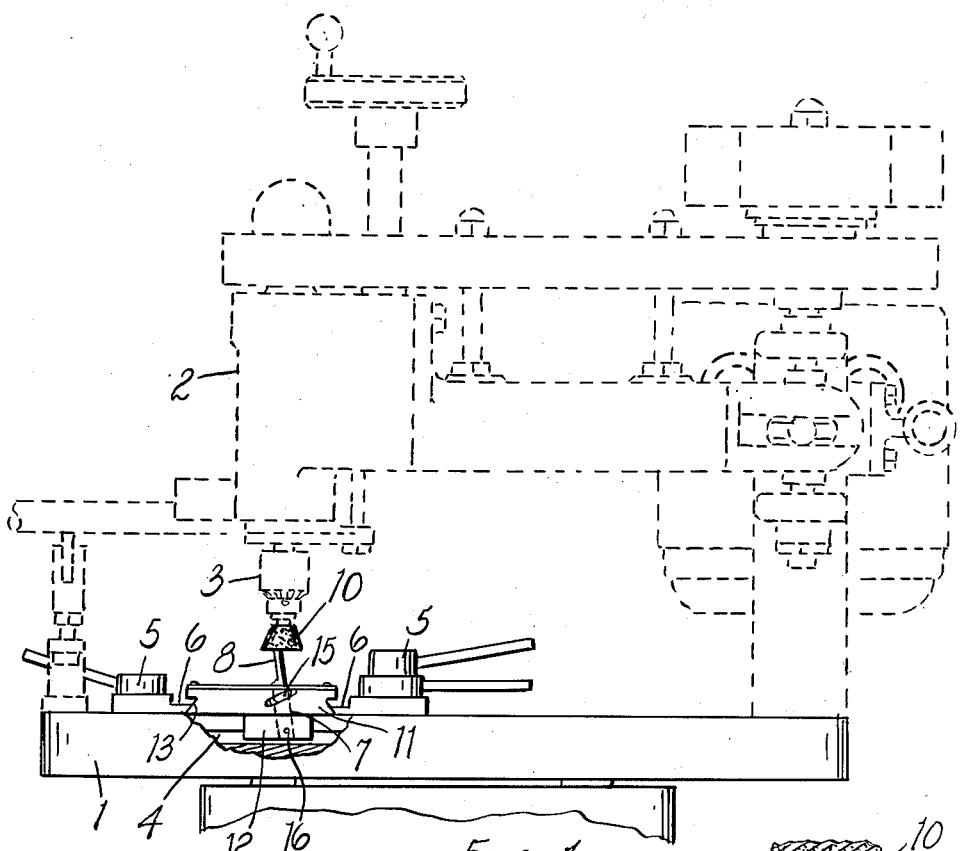
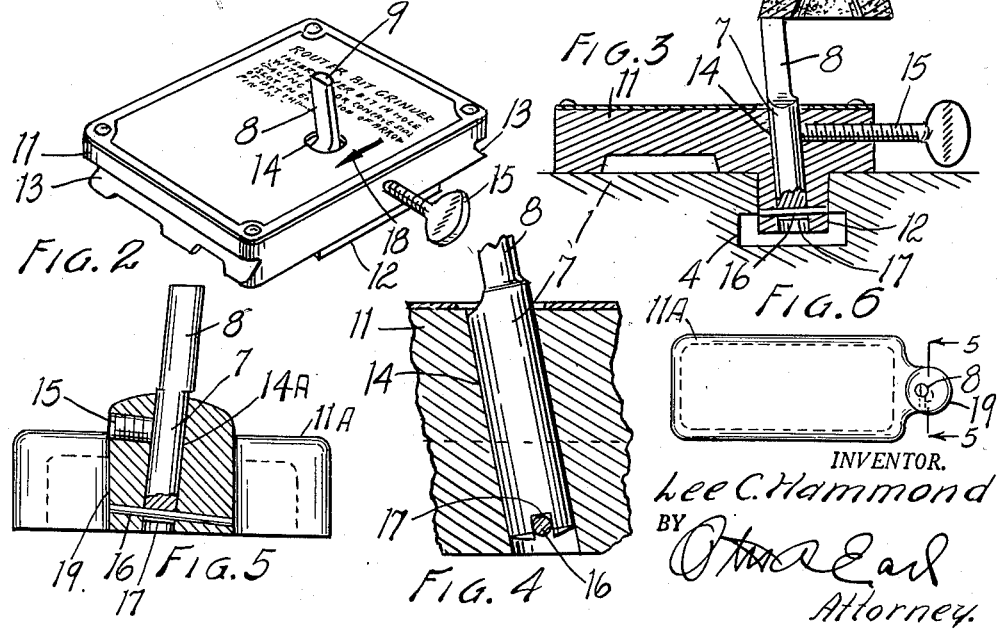
INVENTOR.
Lee C. Hammond
BY
Attorney.

Patented Dec. 18, 1951

2,578,884

UNITED STATES PATENT OFFICE 2,578,884

WORK HOLDER FOR GRINDING ROUTER BITS

Lee C. Hammond, Kalamazoo, Mich., assignor to Hammond Machinery Builders, Inc., Kalamazoo, Mich.

Application March 4, 1949, Serial No. 79,673

10 Claims. (Cl. 51—218)

1

This invention relates to improvements in work holder for grinding router bits.

The principal objects of this invention are:

First, to provide a holder for router bits which will accurately position a bit on a router table so that the bit may be sharpened at the proper angle by a grinding tool carried in the chuck of the router.

Second, to provide means for locating a router bit in a holder so that the bit is easily positioned at the proper angle with respect to a grinding tool to be applied thereto.

Third, to provide a holder which is easily secured in the proper position on a router table without the use of jigs or gauges.

Fourth, to provide a modified form of bit holder which can be manually moved relative to fixed router chuck for grinding a bit held in the holder.

Other objects and advantages relating to details of my bit holder will be apparent from a consideration of the following description and claims. The drawings, of which there is one sheet, illustrate two forms of the bit holder.

Fig. 1 is a side elevational view of my bit holder operatively positioned on a router table and associated with a grinding tool carried by the router mechanism, a portion of the table being broken away and the router being indicated in dotted lines.

Fig. 2 is a perspective view of my holder with a bit in position therein.

Fig. 3 is a fragmentary transverse cross sectional view through the holder as installed on the router table.

Fig. 4 is a fragmentary longitudinal cross sectional view through the holder.

Fig. 5 is a transverse cross sectional view through a modified form of the bit holder taken along the line 5—5 in Fig. 6.

Fig. 6 is a plan view of the holder shown in Fig. 5.

In the preparation of printing plates it is common practice to cut away portions of the surface of the plate to provide blank or nonprinting areas. This work is accomplished on machines known as routers and routers are available, such as is illustrated in Fig. 1, having a table 1 with power driven routing mechanism supported thereabove as indicated at 2. The router mechanism includes a rotatable chuck 3 which is movable over the surface of the table to move a router bit carried by the chuck over selected areas of the table. The table is provided with a longitudinally extending T slot 4 and work holding clamps 5 having opposed jaws 6 are engageable in the slot to clamp printing plates to the table. Other routers have a fixed router head and the printing plate is moved on a table underneath the head to bring selected portions of the plate into contact with a bit carried by the chuck.

2

Router bits driven by the chuck 3 consist of rod-like tools having a shank 7 which may be clamped in the chuck and a face 8 extending to the tip of the bit. The tip of the bit is ground away on a compound angle to the axis of the bit and the face 8 to provide an oblique cutting edge 9 sloping across the face 8.

To provide a holder for holding these bits while they are sharpened by a grinding wheel 10 carried on the chuck, I have provided a block 11 having a depending tongue 12 which is slidably received in the slot 4. The tongue 12 orients the block with respect to the principal axis of the table 1 and the front and rear sides of the block are sloped or chamfered as at 13 for engagement with the jaws 6 of the work holding clamps 5. It is thus possible to quickly and accurately position the work holder on the table 1 when desired.

The body 11 and tongue 12 of the work holder are bored as at 14, the bore being positioned at a compound angle to the surface of the table 1. The term compound angle is intended to mean an angle which diverges from both the transverse and longitudinal vertical coordinate planes of the table 1. The tip of a bit positioned in this bore will therefore be ground at a compound angle with respect to the axis of the bit and the face 8.

In order to secure the shank of the bit in the bore 14 I have provided a set screw 15, and to insure that the bit is received in the proper rotated relation in the bore the tongue 12 is provided with a pin 16 extending transversely of the bore and perpendicular to the axis of the bore. The end of the shank of the bit is transversely slotted as at 17 parallel to the face 8 of the bit so that it is easy to locate the bit in the proper position in the bore. In order to make sure that the bit engages the pin 16 in the proper position and not 180° out of position I provide an indicia such as the arrow 18 on the surface of the block indicating which way the face 8 of the bit should be positioned.

The modified form of bit holder illustrated in Fig. 5 operates on a principle similar to the first form of holder and consists of a body 11A having a bore 14A formed therein at an angle to the surface of the holder. A locating pin 16 intersects the bore 14A and the principal difference between the two holders illustrated is that the holder 11A is not provided with a depending tongue and rests entirely upon the surface of the table 1. The bore is formed in a projection 19 at the end of the body and the body is elongated to form a convenient hand grip so that the holder can be held and moved over the surface of a router table into engagement with a grinder on a fixed router head.

Having thus described my invention, what I claim as new and desire to secure by Letters Patent is:

1. A bit holder adapted to be clamped on the table of a router, said table having a longitudinal slot therein and work holding clamps adjustably mounted thereon, comprising, a flat generally rectangular block having opposed parallel sloping edges engageable between said work holding clamps, a tongue on the bottom of said block perpendicular to said sloping edges and slidably receivable in the slot in said table, a bore formed in said block and tongue and positioned at a compound angle to the surface of said block, a set screw in said body intersecting said bore, a pin carried by said tongue and intersecting said bore perpendicular to the axis thereof and lying in a transverse plane of said block, and an indicium on said block indicating the front of said block.

2. A bit holder adapted to be clamped on the table of a router, said table having a longitudinal slot therein and work holding clamps adjustably mounted thereon, comprising, a flat generally rectangular block having opposed parallel sloping edges engageable between said work holding clamps, a tongue on the bottom of said block perpendicular to said sloping edges and slidably receivable in the slot in said table, a bore formed in said block and tongue and positioned at a compound angle to the surface of said block, a set screw in said body intersecting said bore, and a pin carried by said tongue and intersecting said bore perpendicular to the axis thereof and lying in a transverse plane of said block.

3. A bit holder adapted to be clamped on the table of a router, said table having a longitudinal slot therein and work holding clamps adjustably mounted thereon, comprising, a block having a flat bottom and opposed parallel edges engageable between said work holding clamps, a tongue on the bottom of said block slidably receivable in the slot in said table, a bore formed in said block and positioned at a compound angle to the flat surface of said body, and a pin carried by said tongue and intersecting said bore perpendicular to the axis thereof and lying in a transverse plane of said block.

4. A bit holder adapted to be clamped on the table of a router, said table having a longitudinal slot therein and work holding clamps adjustably mounted thereon, comprising, a generally rectangular block having a flat bottom and opposed parallel edges engageable between said work holding clamps, a tongue on the bottom of said block slidably receivable in the slot in said table, a bore formed in said block and positioned at a compound angle to the flat surface of said block, a pin carried by said tongue and intersecting said bore perpendicular to the axis thereof, and an indicium on said block indicating the front of said block.

5. A bit holder adapted to be clamped on the table of a router, said table having a longitudinal slot therein and work holding clamps adjustably mounted thereon, comprising, a generally rectangular block having a flat bottom and opposed parallel edges engageable between said work holding clamps, a tongue on the bottom of said block slidably receivable in the slot in said table, a bore formed in said block and positioned at a compound angle to the flat surface of said block, and a pin carried by said tongue and intersecting said bore perpendicular to the axis thereof.

6. A bit holder for receiving router bits having transverse slots in the ends of the shanks thereof comprising, an integral generally flat rectangular block having parallel front and rear edges adapted to be engaged between clamping means and a flat table engaging under surface, a bore formed in said block at a compound angle to said edges, a set screw carried by said block and engageable with a bit positioned in said bore, and a pin intersecting the lower end of said bore normal to the axis thereof and adapted to be received in the slots of said bits.

7. A bit holder for receiving router bits having locating slots in the ends of the shanks thereof comprising, an integral rectangular block having a flat bottom and two parallel opposite edges parallel to said bottom adapted to be engaged between clamping means, a bore formed in said block at a compound angle to said edges, a pin intersecting the lower end of said bore and adapted to be received in the slots of said bits, and an indicium on said block indicating the front of said block.

8. A bit holder for receiving router bits having axially opening locating slots in the ends of the shanks thereof comprising, an integral rectangular block having a flat bottom and two parallel opposite edges parallel to said bottom adapted to be engaged between clamping means, a bore of circular section formed in said block through its top surface and at a compound angle to said edges to slidably receive said shanks, and a pin intersecting the lower end of said bore and adapted to be received in the slots of said bits.

9. A bit holder for receiving router bits having axially opening locating notches in the ends of the shanks thereof comprising, an integral block having a flat bottom, a bore of circular section formed in said block through its top surface and at a compound angle to said bottom to slidably receive said shanks and a projection intersecting the lower end of said bore and adapted to be received in the notches of said bits when said shanks are received in said bore.

10. A bit holder for receiving router bits having locating notches in the shanks thereof comprising, an elongated integral body having a flat bottom, a projection on one end of said body, a bore formed in said projection at an oblique angle to said bottom, and a projection intersecting the lower end of said bore and adapted to be received in the notches of said bits.

LEE C. HAMMOND.

REFERENCES CITED

The following references are of record in the file of this patent:

UNITED STATES PATENTS

| Number | Name | Date |
| --- | --- | --- |
| 930,695 | Royle | Aug. 10, 1909 |
| 1,034,595 | Dreyer | Aug. 6, 1912 |
| 1,385,519 | Calhoun | July 26, 1921 |
| 1,405,474 | Yehle | Feb. 7, 1922 |
| 1,873,612 | Martell | Aug. 23, 1932 |
| 2,114,757 | Yerkes | Apr. 19, 1938 |
| 2,353,131 | Ford | July 11, 1944 |
| 2,362,306 | Ringzelli | Nov. 7, 1944 |
| 2,385,902 | Wilson | Oct. 2, 1945 |
| 2,389,069 | Mascarenhas | Nov. 13, 1945 |
| 2,432,058 | Wiken et al. | Dec. 2, 1947 |

FOREIGN PATENTS

| Number | Country | Date |
| --- | --- | --- |
| 13,391 | Denmark | June 23, 1910 |
| 110,441 | Great Britain | Oct. 25, 1917 |
| 581,595 | Great Britain | Oct. 17, 1946 |